US012351163B2

(12) United States Patent
Ide et al.

(10) Patent No.: US 12,351,163 B2
(45) Date of Patent: Jul. 8, 2025

(54) AUTOMATIC DRIVING CONTROL SYSTEM

(71) Applicant: TOYOTA JIDOSHA KABUSHIKI KAISHA, Toyota (JP)

(72) Inventors: Hirohito Ide, Nagoya (JP); Yuchi Yamanouchi, Toyota (JP); Satoshi Koganemaru, Toyota (JP); Shogo Nakata, Kariya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 189 days.

(21) Appl. No.: 18/315,962

(22) Filed: May 11, 2023

(65) Prior Publication Data

US 2023/0278545 A1    Sep. 7, 2023

Related U.S. Application Data

(63) Continuation of application No. 17/023,753, filed on Sep. 17, 2020, now Pat. No. 11,685,370.

(30) Foreign Application Priority Data

Oct. 4, 2019    (JP) .................................. 2019-183574

(51) Int. Cl.
*B60W 30/085*    (2012.01)
*B60W 30/095*    (2012.01)
*B60W 50/14*     (2020.01)

(52) U.S. Cl.
CPC ........ *B60W 30/085* (2013.01); *B60W 30/095* (2013.01); *B60W 50/14* (2013.01)

(58) Field of Classification Search
CPC .. B60W 30/085; B60W 30/095; B60W 50/14; B60W 2050/143; B60W 30/18109;
(Continued)

(56) References Cited

U.S. PATENT DOCUMENTS

2009/0021491 A1* 1/2009 Kawamura ............ B60K 35/90
                                                    345/173
2010/0079413 A1* 4/2010 Kawashima ........ G06F 3/04886
                                                    715/781
(Continued)

FOREIGN PATENT DOCUMENTS

| CN | 104290745 A | 1/2015 |
| JP | 2015230552 A | 12/2015 |
| JP | 2018012478 A | 1/2018 |

OTHER PUBLICATIONS

U.S. Appl. No. 17/023,753, filed Sep. 17, 2020, Hirohito Ide et al.
(Continued)

*Primary Examiner* — Sihar A Karwan
(74) *Attorney, Agent, or Firm* — Dinsmore & Shohl LLP

(57) ABSTRACT

An automatic driving vehicle is running in an automatic driving mode effected by a driving control device. An operator is able to instruct via a SLOW DOWN button on a touch panel that the automatic driving vehicle is to be decelerated or stopped. Should any anomaly occur to the SLOW DOWN button, a message or the like is displayed on a touch panel to encourage operation of an emergency stop switch. When the operator operates the emergency stop switch, emergency stop control is executed.

1 Claim, 19 Drawing Sheets

(58) Field of Classification Search
CPC ... B60W 2050/0292; B60W 2050/146; B60W 2300/10; B60W 2540/215; B60W 2720/106; B60W 50/029; B60W 60/00186; B60W 60/007; B60W 50/082; B60W 60/005; B60K 2360/1442; B60K 2360/175; B60K 35/10; B60K 35/28; B60K 2360/1434; B60T 7/12
See application file for complete search history.

(56) References Cited

U.S. PATENT DOCUMENTS

| | | | |
|---|---|---|---|
| 2018/0052463 A1* | 2/2018 | Mays | G07C 5/0808 |
| 2018/0281817 A1* | 10/2018 | Ravichandran | B60K 35/10 |
| 2020/0285962 A1* | 9/2020 | Garcia Satorras | G05B 13/04 |

OTHER PUBLICATIONS

Freedom National Blog Cropyright 2022, Driving in the Rain Safety Tips, Sep. 21, 2018, https://freedomgeneral.com/blog/driving-in-the-rain-safety-tips/.

\* cited by examiner

AUTOMATIC DRIVING CONTROL SYSTEM

CROSS REFERENCE TO RELATED APPLICATION

This application is a continuation of U.S. patent application Ser. No. 17/023,753 filed on Sep. 17, 2020, which claims priority to Japanese Patent Application No. 2019-183574 filed on Oct. 4, 2019, both of which are incorporated herein by reference in their entirety including the specification, claims, drawings, and abstract.

TECHNICAL FIELD

This disclosure relates to an automatic driving control system to be implemented in an automatic driving vehicle.

BACKGROUND

Automatic driving vehicles capable of automatic driving have been known. Automatic driving means that driving control, for example, including vehicle speed control or steering control, is fully or partially executed by a computer. An automatic driving vehicle is normally adapted to a plurality of driving modes, including an automatic driving mode for automatic driving and a manual driving mode for driving control by an operator on board the automatic driving vehicle. Some automatic driving vehicles receive an operation input from an operator to execute control in the automatic driving mode.

JP 2018-12478A describes that, in a situation that does not allow continuation of automatic driving of an automatic driving vehicle, the vehicle displays an image or the like to encourage an occupant corresponding to an operator to start driving in person. If this occupant does not start driving, an emergency stop button is displayed on a touch panel, while an alarm sound is output, to encourage all occupants to touch the emergency stop button.

SUMMARY

Consider a case in which there is provided a stop button for stopping a vehicle upon receipt of an instruction from an operator while driving in the automatic driving mode or a launch button for launching the vehicle upon receipt of an instruction from the operator. In this case, there is doubt about how to stop or launch the vehicle if a situation should occur in which the button cannot be operated. For example, in the case in which a button is displayed on a touch panel, the touch button may be inoperable because an anomaly has occurred to the touch panel itself or to a communication system of the touch panel. The above-mentioned JP 2018-12478A does not discuss this case.

It is an object of this disclosure to enable handling of a case in which an anomaly occurs to the deceleration operation device of an automatic driving vehicle having a deceleration operation device capable of receiving a stop or deceleration instruction from an operator while the vehicle is running in an automatic driving mode, based additionally on a decision by the operator.

An automatic driving control system according to this disclosure includes an automatic driving control device for controlling running of an automatic driving vehicle in an automatic driving mode; a deceleration operation device for receiving an operation instruction from an operator while the automatic driving vehicle is running in the automatic driving mode to instruct the automatic driving control device to decelerate or to stop the automatic driving vehicle; an emergency stop operation device provided separately from the deceleration operation device to receive an operation instruction by the operator to instruct an emergency stop; and a transmission device for conducting a transmission for encouraging the operator to operate the emergency stop operation device when an anomaly occurs to the deceleration operation device.

In one embodiment of the automatic driving control system, the deceleration operation device may be a button displayed on a touch panel; and the transmission device may conduct the transmission for encouraging the operator to operate the emergency stop operation device, by displaying a message on the touch panel.

In one embodiment of the automatic driving control system, the automatic driving control system may further include a control device for executing control such that the automatic driving vehicle is forcibly stopped for emergency reasons when an anomaly occurs to the automatic driving control device or to an automatic driving sensor for outputting measured data to the automatic driving control device.

In one embodiment of the automatic driving control system, running control by the automatic driving control device may be invalidated and control for an emergency stop may be conducted when the emergency stop operation device instructs an emergency stop.

In one embodiment of the automatic driving control system, the running control by the automatic driving control device may be invalidated by shutting down the automatic driving control device or by invalidating a control signal outputted from the automatic driving control device.

In one embodiment of the automatic driving control device, when the emergency stop operation device is operated, running control by the automatic driving control device may be invalidated after the elapse of a first period of time when the behavioral stability of the automatic driving vehicle during deceleration is low, and the running control by the automatic driving control device may be invalidated after the elapse of a second period of time that is shorter than the first period of time when the behavioral stability of the automatic driving vehicle during deceleration is high.

In one embodiment of the automatic driving control system, when the emergency stop operation device is operated, first deceleration may be conducted to thereby stop the automatic driving vehicle for emergency reasons when the behavioral stability of the automatic driving vehicle during deceleration is low, and second deceleration that is sharper than the first deceleration may be conducted to thereby stop the automatic driving vehicle for emergency reasons when the behavioral stability of the automatic driving vehicle during deceleration is high.

According to this disclosure, in the case where an anomaly occurs to the deceleration operation device, a decision as to whether to apply an emergency stop can be entrusted to the operator. With the above, enhanced security can be expected to be obtained through an appropriate decision by the operator, based on the situation, as compared with a case in which an emergency stop is always applied.

BRIEF DESCRIPTION OF DRAWINGS

Embodiment(s) of the disclosure will be described based on the following figures, wherein.

DESCRIPTION OF EMBODIMENTS

Figure 1:
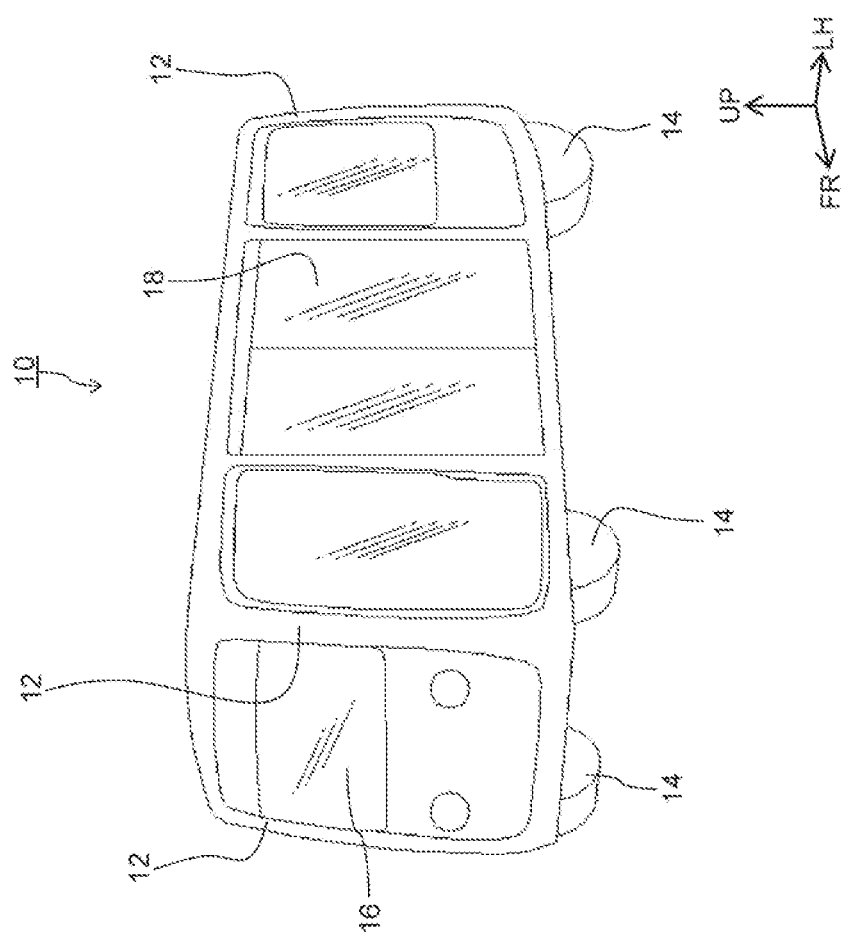
FIG. 1 illustrates the external appearance of an automatic driving vehicle according to an embodiment.

Embodiments will now be described referring to the drawings. Although a specific aspect will be described below to facilitate understanding of the embodiment, this is only for illustration of an example of an embodiment, and various other embodiments are possible.

FIG. 1 illustrates the external appearance of an automatic driving vehicle 10 according to the embodiment. In the respective drawings attached to this specification, terms "front (FR)" and "rear" mean front and rear, respectively, in the front-rear direction of a vehicle; terms "left (LH)" and "right" mean left and right, respectively, when facing forward; and terms "up (UP)" and "down" mean up and down, respectively, in the up-down direction of a vehicle.

The automatic driving vehicle 10 is shaped like a substantially rectangular parallelepiped that is front-rear symmetrical, and has an external design that is also front-rear symmetrical. The automatic driving vehicle 10 has pillars 12 disposed at the four respective corners in a plan view and extending in the up-down direction. Below each pillar 12, a wheel 14 is mounted. A large part of each of the front, rear, right, and left side walls of the automatic driving vehicle 10 is made from one or more semi-transparent panels 16. The panel 16 may be a display panel, where letters or the like may be displayed.

One or more panels constituting the left surface of the automatic driving vehicle 10 constitute a slidable door 18. The door 18 slides to open so that an occupant can get on or off the vehicle. An extendable ramp (not illustrated in FIG. 1) is stored below the door 18. The ramp is used, for example, for an occupant in a wheelchair to get on or off the vehicle.

The automatic driving vehicle 10 is a vehicle capable of automatic driving. Specifically, the automatic driving vehicle 10 can be driven in a plurality of driving modes, including an automatic driving mode and a manual driving mode. In this embodiment, the automatic driving mode includes a control mode for control by a management center and a control mode for control by the automatic driving vehicle 10.

The automatic driving mode is a driving mode in which driving control is executed mainly by a computer. In this specification, driving control is a concept encompassing gear shift control, vehicle speed control, and steering control. Vehicle speed control is a concept encompassing launch control, stop control, and acceleration/deceleration control of the automatic driving vehicle 10. Steering control is a concept encompassing maintenance and change of the steering angle.

Of the automatic driving modes, the control mode for control by a management center is a mode in which driving control is executed by a computer mounted in the automatic driving vehicle 10 under driving control by the management center. The management center is available to manage and control a plurality of automatic driving vehicles 10, and a network for communication with the respective automatic driving vehicles 10 is constituted. In the control mode for control by the management center, the running route of the automatic driving vehicle 10 is determined under control by the management center. Driving control by a computer mounted in the automatic driving vehicle 10 is executed largely under control by the management center. In this embodiment, however, launch control for launching a vehicle in a stopped state is executed upon receipt of an input of an operation by the operator on board the automatic driving vehicle 10.

Of the automatic driving modes, the control mode for control by the automatic driving vehicle 10 is a driving mode in which, in principle, a majority of the driving control of the automatic driving vehicle 10 is executed based on determination made by a computer mounted in the automatic driving vehicle 10 without receiving control from outside. In the control mode for control by the automatic driving vehicle 10 in this embodiment, a computer in the automatic driving vehicle 10 executes driving control, based on the results of measurements by various automatic driving sensors (for example, a camera, a lidar, or the like) mounted in the automatic driving vehicle 10 without receiving control by the management center, so that the automatic driving vehicle 10 runs along a predetermined route. Only, launch control for launching the vehicle in a stopped state is executed upon receipt of an input of an operation by the operator on board the automatic driving vehicle 10.

The manual driving mode is a mode in which automatic driving of the automatic driving vehicle 10 is not executed, but the operator on board the automatic driving vehicle 10 executes driving control of the automatic driving vehicle 10.

An operator here refers to a person on board the automatic driving vehicle 10 and involved in control of the automatic driving vehicle 10. In the automatic driving mode, in which, mainly, the management center or the automatic driving vehicle 10 itself executes driving control, the operator has few occasions to execute driving control. Nevertheless, as the operator is involved in launch control for launching the vehicle in a stopped state, and retains control, for example, for deceleration control or the like, the operator can be considered to be involved in control of the automatic driving vehicle 10. Meanwhile, in the manual driving mode, the operator serves as a driver who conducts a driving operation of the automatic driving vehicle 10 in person, and thus can be considered to be involved in control of the automatic driving vehicle 10.

The automatic driving vehicle 10 is a vehicle in which many unspecified occupants ride. In this embodiment, the automatic driving vehicle 10 is utilized as a bus that runs along a predetermined route within a specified site to transport passengers. Thus, the automatic driving vehicle 10 is expected to repeat stop and launch at a relatively high frequency. In addition, the automatic driving vehicle 10 is expected to run at a relatively slow speed (for example, slower than 30 km/h).

The configuration of use of the automatic driving vehicle 10 disclosed in this specification, however, can be changed arbitrarily. For example, the automatic driving vehicle 10 can be utilized as a mobile business space, a sales outlet that displays and sells various products, or an eating outlet that serves cooked foods and drinks. Alternatively, as another configuration, the automatic driving vehicle 10 can be used as an office where people do office work or have a meeting with clients. Occasions in which the automatic driving vehicle 10 is utilized are not limited to business scenes, but the automatic driving vehicle 10 may be used, for example, as a private moving means. The running pattern and speed of the automatic driving vehicle 10 can be changed arbitrarily.

The automatic driving vehicle 10 is an electric vehicle including a drive motor as a motor, which receives electric power from a battery. The battery is a chargeable and dischargeable secondary battery, and is regularly charged with power from an outside source. The automatic driving vehicle 10, however, is not limited to an electric vehicle, and may be a vehicle of any other type. For example, the automatic driving vehicle 10 may be an engine vehicle having an engine as a motor, or a hybrid vehicle having an engine and a drive motor as a motor. Alternatively, the automatic driving vehicle 10 may be a hydrogen vehicle that drives a drive motor with electric power generated by a fuel cell.

Figure 2:
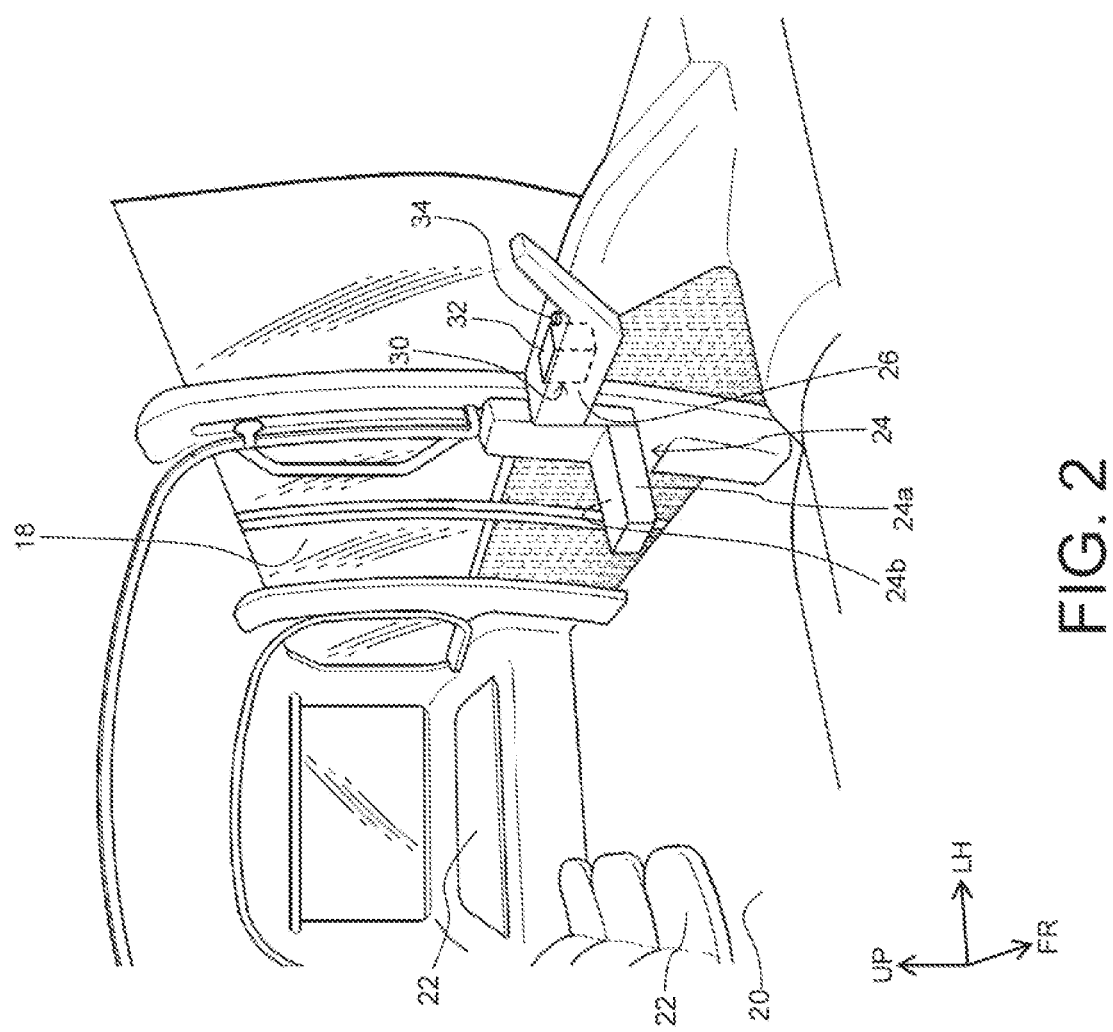
FIG. 2 is a first perspective view of a vehicle cabin of an automatic driving vehicle according to the embodiment.
Figure 3:
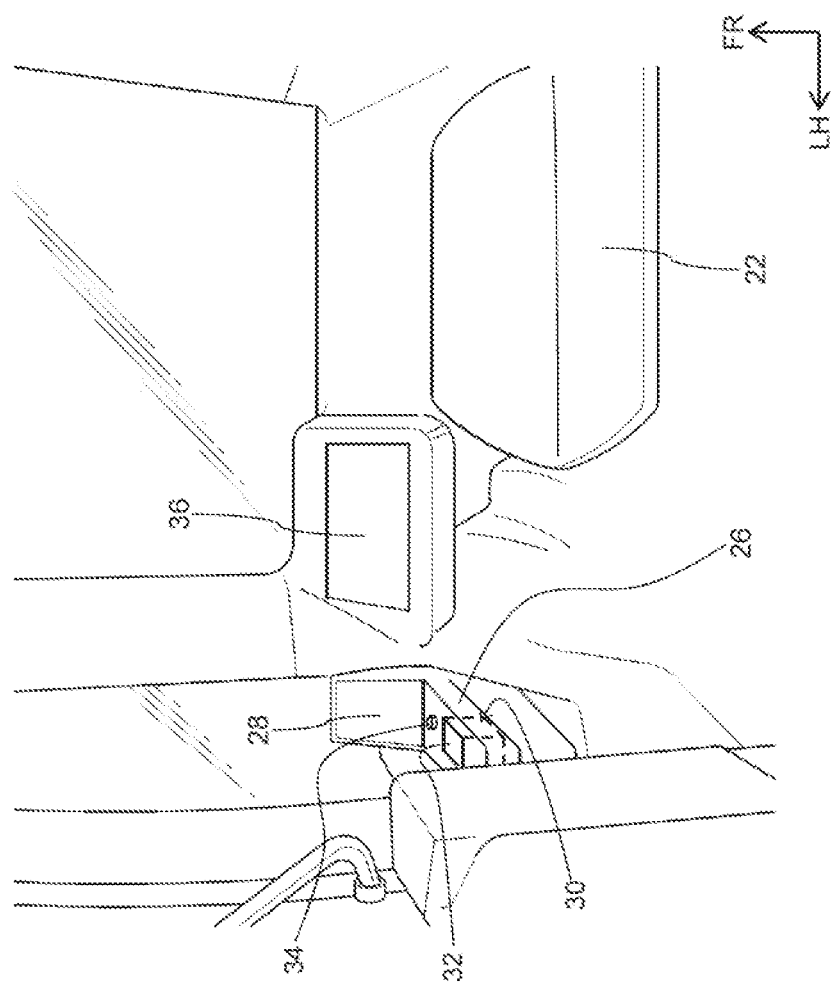
FIG. 3 is a second perspective view of a vehicle cabin of an automatic driving vehicle according to the embodiment.

FIG. 2 and FIG. 3 are perspective views of the interior of the cabin of the automatic driving vehicle 10. As the automatic driving vehicle 10 is used as a bus, as described above, an area in the middle of the cabin constitutes a floor 20 where occupants stand or where a wheelchair with an occupant sitting therein is placed. Along the side wall in the cabin, seats 22 for occupants are provided.

The automatic driving vehicle 10 includes an operator seat 24 for the operator who is responsible for driving control of the automatic driving vehicle 10 and operates various instruments (an air conditioner, a wiper, or the like) provided to the automatic driving vehicle 10. In FIG. 2, a seat portion 24a of the operator seat 24 is flipped down such that a seat bottom 24b is seen. The seat portion 24a can be flipped up. Although in this embodiment the operator seat 24 is provided on the left surface and forward of the door 18 in the cabin, the operator seat 24 may be provided on the right surface of the cabin.

Forward of the operator seat 24, there is provided an armrest 26 that extends in the front-rear direction for the operator sitting on the operator seat 24 to rest his/her arm thereon. As in this embodiment the operator seat 24 is provided on the left surface inside the cabin, as described above, the armrest 26 as well is disposed in the left end area in the cabin. If the operator seat 24 is provided on the right surface inside the cabin, the armrest 26 as well is disposed in the right end area in the cabin. The armrest 26 is provided at a position higher than the seat bottom 24b of the operator seat 24 that is in a condition that allows the operator to sit thereon, or a seating condition.

On the front end portion of the armrest 26, a touch panel 28 is provided standing upward from the upper surface of the armrest 26 (refer to FIG. 3). As the touch panel 28 is directed rearward (that is, toward the operator seat 24), the operator can operate the touch panel 28 with his/her finger while sitting on the operator seat 24 and resting his/her arm on the armrest 26. The touch panel 28 is a user interface, and enables operations other than driving, in addition to input of an operation relevant to driving in the automatic driving mode (operation for vehicle speed control or the like). Operations other than driving include, for example, control operations relative to vehicle-mounted instruments (a turn lamp, a horn, a headlight, an air conditioner, a wiper, or the like) mounted in the automatic driving vehicle 10. Details of the display screen of the touch panel 28 will be described later.

The armrest 26 includes a storage unit 30 for storing a mechanical operation unit for conducting an operation for driving control relative to the automatic driving vehicle 10. The storage unit 30 is covered by a cap 32. That is, the mechanical operation unit is not exposed in the vehicle cabin when being stored in the storage unit 30. In this embodiment, the upper surface of the armrest 26 is flush with the cap 32. Although in this embodiment the storage unit 30 is provided to the armrest 26, the storage unit 30 may be provided to a place other than the armrest 26. In this case as well, the storage unit 30 is provided in an unfeatured place, for example, on the end portion of any of the front, rear, right, and left sides in the vehicle cabin. The storage unit 30, the cap 32, and the mechanical operation unit will be described later in detail.

On the upper surface of the armrest 26, an emergency stop switch 34 is additionally provided. The emergency stop switch 34, together with a signal transmission circuit or the like provided behind, constitutes an emergency stop operation device for the operator to input an emergency stop instruction to the automatic driving vehicle 10. In this embodiment, the emergency stop switch 34 is shaped like a button, and operates upon being pressed by the operator. As an emergency stop operation device, various other devices can be employed, such as a button to be displayed on the touch panel 28 or a device for capturing the image of the operator gesturing for an emergency stop.

As operation devices for an operation relevant to the vehicle speed of the automatic driving vehicle 10, the automatic driving vehicle 10 includes only three operation devices; namely, the touch panel 28, the mechanical operation unit, and the emergency stop switch 34. That is, the automatic driving vehicle 10 does not include a foot pedal, such as an acceleration pedal or a brake pedal, like those provided in conventional automobiles, to be operated with a foot to perform an operation relevant to the vehicle speed.

A display 36 for displaying information on the automatic driving vehicle 10 is provided at the front left corner in the cabin (refer to FIG. 3). The display 36 displays information, such as, for example, the vehicle speed of the automatic driving vehicle 10, outside temperature, or the next bus stop. Similar to the touch panel 28, the display 36 as well is directed rearward such that the touch panel 28 and the display 36 appear aligned to each other to the operator sitting on the operator seat. This allows the operator to visually check both the touch panel 28 and the display 36. For example, the display 36 is provided at the same height as the touch panel 28. Specifically, the display 36 and the touch panel 28 are disposed such that the top end of the display 36 is positioned at the same height as that of the touch panel 28, the lower end of the display 36 is positioned at the same height as that of the touch panel 28, or the middle portion of the display 36 in the height direction is positioned at the same height as that of the touch panel 28. Further, another display (not illustrated) is provided in a different place in the vehicle to provide information to the passengers. Further, a speaker (not illustrated) is provided in the vehicle to provide information to the passengers via sound.

Figure 4:
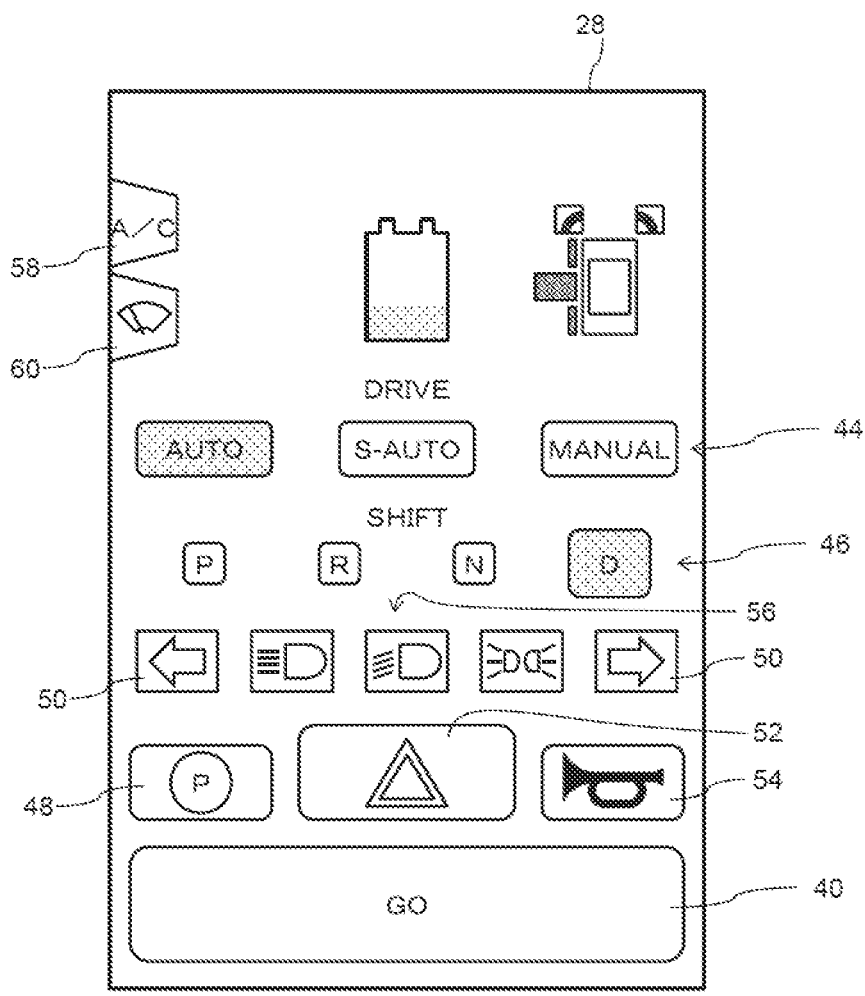
FIG. 4 illustrates a screen of a touch panel displayed with the vehicle stopped.
Figure 5:
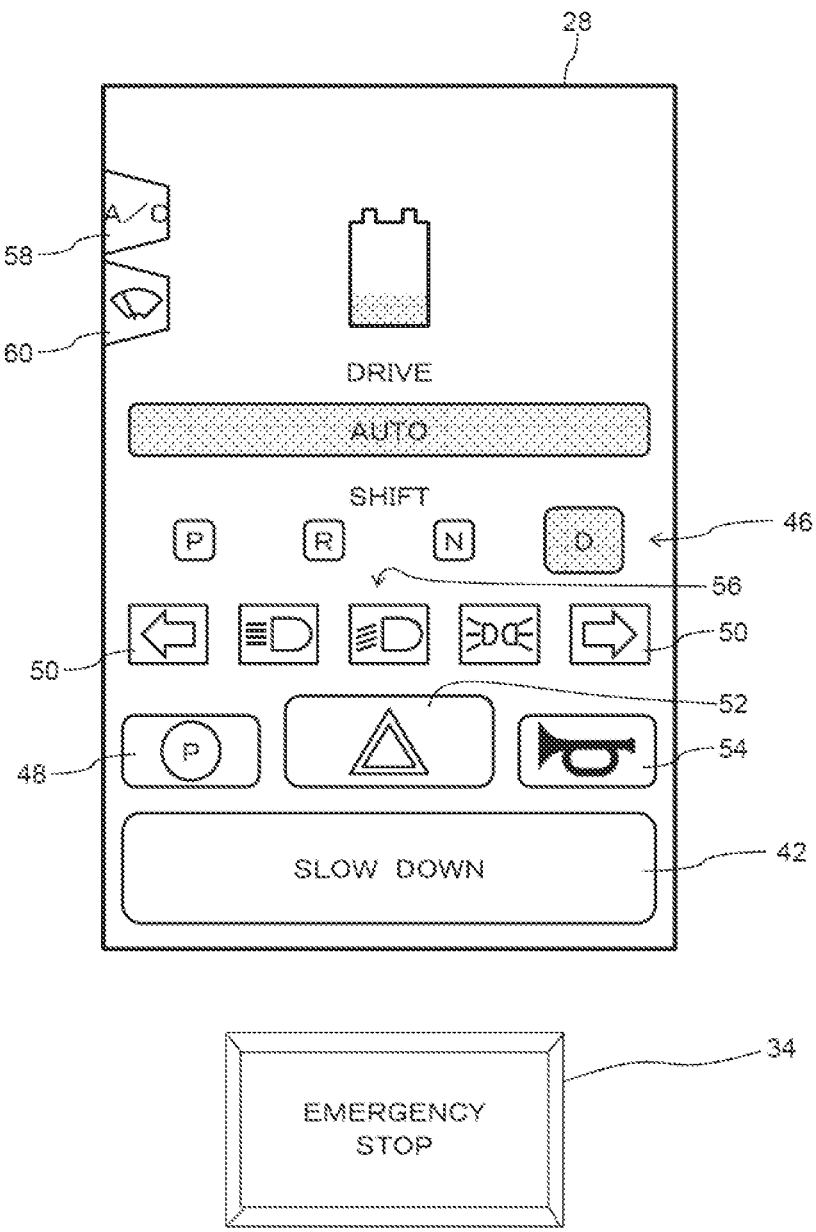
FIG. 5 illustrates a screen of a touch panel displayed with the vehicle in automatic running.

FIG. 4 and FIG. 5 illustrate a screen displayed on the touch panel 28 and the emergency stop switch 34 provided below the touch panel 28. FIG. 4 illustrates a screen displayed on the touch panel 28 with the automatic driving vehicle 10 stopped in the automatic driving mode, and FIG. 5 illustrates a screen displayed with the automatic driving vehicle 10 running in the automatic driving mode.

Initially, referring to FIG. 4, an image displayed on the touch panel 28 when the automatic driving vehicle 10 in the automatic driving mode is stopped will be described. On the touch panel 28, a GO button 40 is displayed as a vehicle speed control button for inputting a vehicle speed control instruction to the automatic driving vehicle 10. The GO button 40 is a button for inputting a launch instruction in relation to the automatic driving vehicle 10. With the GO button 40 operated, the automatic driving vehicle 10 starts running (in the automatic driving mode in this case).

Referring to FIG. 5, an image displayed on the touch panel 28 when the automatic driving vehicle 10 is in the automatic driving mode is running will be described. The touch panel 28 displays a SLOW DOWN button 42 as a vehicle speed control button, instead of the GO button 40. The SLOW DOWN button 42 is a button for inputting a deceleration control instruction relative to the automatic driving vehicle 10. With the SLOW DOWN button 42 operated, the automatic driving vehicle 10 starts deceleration. Repetitive operations of the SLOW DOWN button 42 may enable stopping of the automatic driving vehicle 10. The SLOW DOWN button 42, together with the touch panel 28 and the signal transmission circuit, constitutes a deceleration operation device into which the operator can input a deceleration or stop instruction in the automatic driving mode.

In this embodiment, while a vehicle in the automatic driving mode is running, the operator can input only a deceleration control instruction as a vehicle speed control. Alternatively, a button for inputting an acceleration control instruction or a button for inputting a stop instruction may be displayed, in addition to the SLOW DOWN button 42, so that the operator can input an acceleration control instruction or a stop instruction. Needless to say, in the automatic driving mode, the automatic driving vehicle 10 can automatically decelerate or stop in response to an instruction from the management center. When the automatic driving vehicle 10 stops, the GO button 40 appears again, as illustrated in FIG. 4, instead of the SLOW DOWN button 42.

On the touch panel 28, in addition to the vehicle speed control button, there are displayed a driving mode button 44 for inputting an instruction to change the driving mode, a shift button 46 for inputting a gear change control instruction, a P brake button 48 for inputting an activation/release instruction of an electric parking brake, and various instruction control buttons for inputting an instrument control instruction relative to the instructions provided to the automatic driving vehicle 10. Of these buttons, the driving mode button 44 is a button for setting a driving mode, and includes "AUTO" for setting the automatic driving mode, "S-AUTO" for setting a partial automatic driving mode, and "MANUAL" for setting the manual driving mode.

In the example illustrated in FIG. 4 and FIG. 5, as the instrument control buttons, there are provided a turn lamp button 50 for controlling a turn lamp, a hazard warning lamp button 52 for causing a hazard warning lamp to operate, a horn button 54 for causing a horn to operate, a light button 56 for controlling a headlight and a taillight, an air conditioner tab 58 for controlling an air conditioner, and a wiper tab 60 for controlling a wiper. With the air conditioner tab 58 touched, various buttons for controlling the air conditioner appear. With the wiper tab 60 touched, various buttons for controlling the wiper appear. The driving mode button 44 is operable only while the automatic driving vehicle 10 is stopped. As in this embodiment gears are not allowed to be shifted through operation by the operator in the automatic driving mode, the shift button 46 is inoperable.

On the touch panel 28, there are displayed the remaining amount of the battery of the automatic driving vehicle 10, the open/close state of the door 18, the condition of the ramp, and measured results of the various sensors provided to the automatic driving vehicle 10.

The emergency stop switch 34 is disposed under the touch panel 28. Different from the various buttons on the touch panel 28, the emergency stop switch 34 is a physical button. As the emergency stop switch 34 is located near the touch panel 28, the operator can press the emergency stop switch 34 immediately when the operator feels the need for emergency stop to thereby stop the automatic driving vehicle 10 for emergency reasons. Specific processing for an emergency stop will be described later. The emergency stop switch 34 includes a built-in light emitting diode to encourage the operator to press the emergency stop switch 34 by means of light emission, as will be described later.

Figure 6:
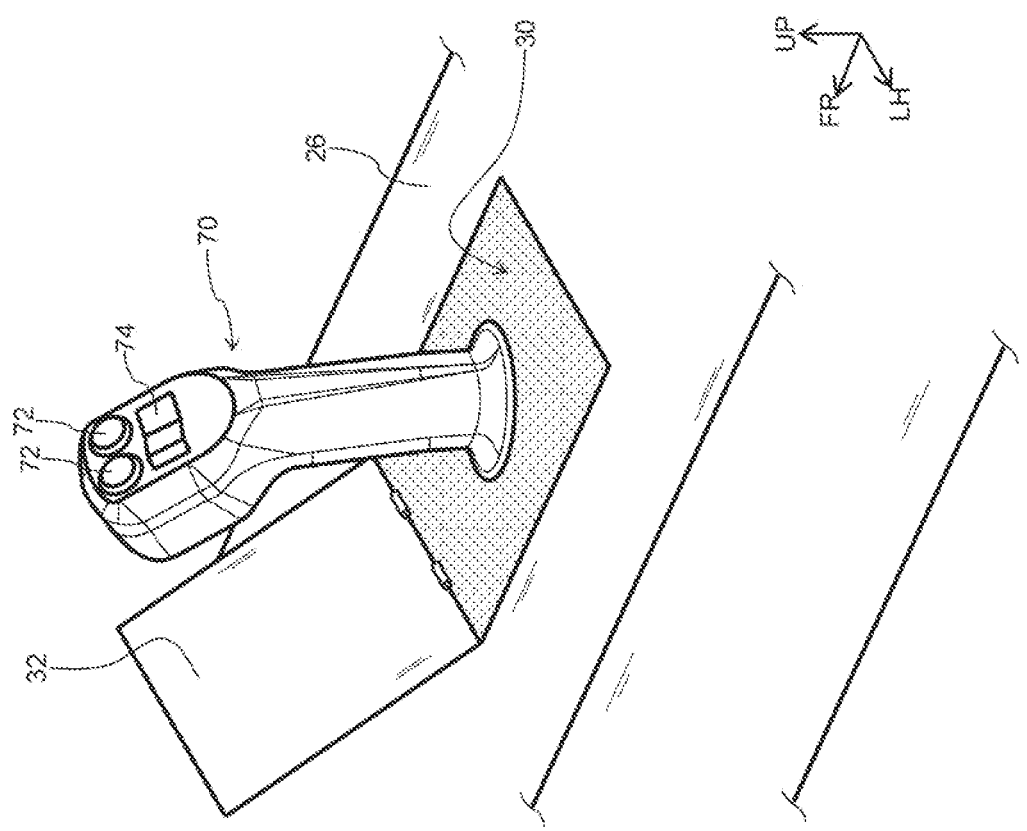
FIG. 6 is a perspective view of a mechanical operation unit.

FIG. 6 illustrates a mechanical operation unit 70 pulled out of the storage unit 30. The mechanical operation unit 70 is shaped like a stick, and is stored in an extending posture in the up-down direction inside the storage unit 30. As the mechanical operation unit 70 is stored in the storage unit 30, the operator is less likely to erroneously operate the mechanical operation unit 70, and occupants other than the operator are less likely to operate the mechanical operation unit 70. The cap 32 can be keyed so that no occupant other than the operator can open the cap 32. As the mechanical operation unit 70 is stored in the storage unit 30, the space inside the vehicle can be effectively utilized.

The operator opens the cap 32 and pulls out the mechanical operation unit 70 upward, upon which the mechanical operation unit 70 is ready to be operated, as illustrated in FIG. 6. Alternatively, a switch may be provided inside the storage unit 30, and operation of the switch causes the mechanical operation unit 70 to automatically move upward from the storage unit 30. The mechanical operation unit 70 in an operable state is standing upward from the upper surface of the armrest 26. As described above, as the armrest 26 is provided at a position higher than the seat bottom 24b of the operator seat 24 in the seating condition, the mechanical operation unit 70 as well is provided at a position higher than the seat bottom 24b in the seating condition.

The mechanical operation unit 70 is pulled out of the storage unit 30 mainly when the automatic driving vehicle 10 is in the manual driving mode. When the automatic driving vehicle 10 is in the automatic driving mode, the mechanical operation unit 70 may be stored in the storage unit 30 to prevent erroneous operation of the mechanical operation unit 70.

The mechanical operation unit 70 is adapted to lever operation. That is, the mechanical operation unit 70 can be tilted in the front-rear and right-left directions with its lower end as a fulcrum. With the mechanical operation unit 70 tilted forward, an acceleration control instruction is inputted to the automatic driving vehicle 10. With the mechanical operation unit 70 tilted rearward, a deceleration control instruction is inputted to the automatic driving vehicle 10. With the mechanical operation unit 70 tilted leftward, a left turn control instruction is inputted to the automatic driving vehicle 10. With the mechanical operation unit 70 tilted rightward, a right turn control instruction is inputted to the automatic driving vehicle 10.

On the upper portion of the mechanical operation unit 70, there is provided a mechanical instrument control switch for inputting an instrument control instruction in relation to an instrument provided to the automatic driving vehicle 10. In this embodiment, as such an instrument control switch, a switch for controlling reporting toward outside the vehicle is provided. Specifically, turn lamp switches 72 for causing a turn lamp to operate and a horn switch 74 for causing a horn to operate are provided. As described above, the mechanical operation unit 70 enables not only issuance of an acceleration/deceleration control instruction and a turn control instruction but also operation of the turn lamp or the horn. Needless to say, as an instrument control switch, a switch for controlling other instruments may be provided to the mechanical operation unit 70.

In this embodiment, the touch panel 28 is disposed on the front end portion of the armrest 26, while the mechanical operation unit 70 is disposed standing on the upper side of the armrest 26. That is, the touch panel 28 is disposed near the mechanical operation unit 70. In this embodiment, an instrument provided to the automatic driving vehicle 10 is operated with the touch panel 28 even when driving control is conducted with the mechanical operation unit 70. Thus, disposition of the touch panel 28 near the mechanical operation unit 70 allows the operator to operate both the touch panel 28 and the mechanical operation unit 70.

Figure 7:
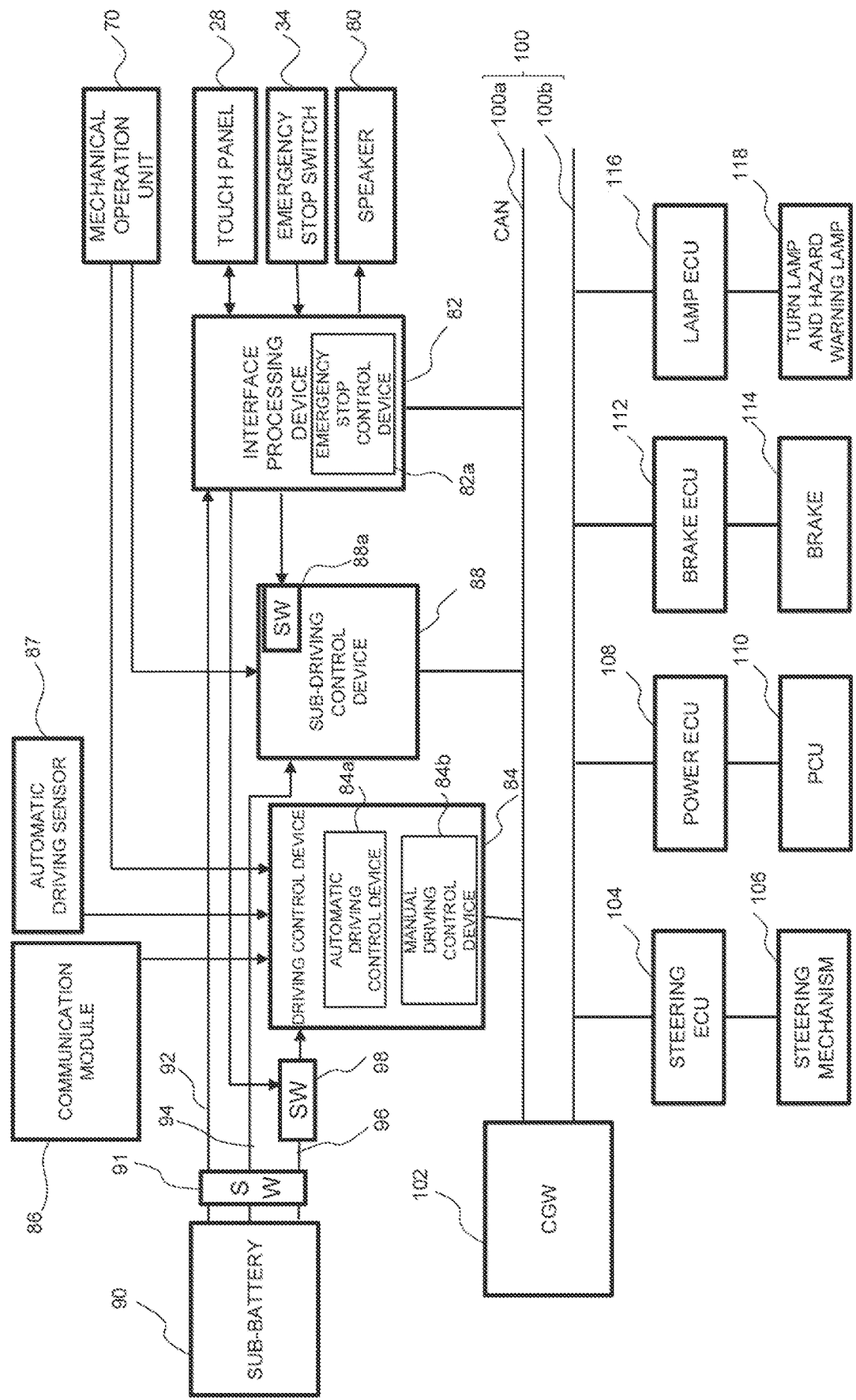
FIG. 7 is a functional block diagram of a driving control device according to the embodiment.

Subsequently, referring to FIG. 7, the control mechanism of the automatic driving vehicle 10 will be described. FIG. 7 is a simple functional block diagram illustrating the structure relevant to driving control to be applied to the automatic driving vehicle 10.

In the upper right section of FIG. 7, the above-described mechanical operation unit 70, touch panel 28, and emergency stop switch 34 are shown. A speaker 80 is a device provided inside the cabin to convey sound to the operator or passengers.

An interface processing device 82 is an example of a user interface control device to which a user interface, such as the touch panel 28, the emergency stop switch 34, the speaker 80, or the like, is connected and that executes control relevant to these user interfaces. The interface processing device 82 operates through control of computer hardware, such as a processor, by software. The interface processing device 82 is connected also to a bus 100a that constitutes a controller area network (CAN) 100, or a network provided inside the automatic driving vehicle 10. The interface processing device 82 sends an operation signal inputted from the touch panel 28 to the bus 100a, and sends a signal received from the bus 100a to the touch panel 28 or the like.

The interface processing device 82 incorporates an emergency stop control device 82a, and executes control relevant to an emergency stop operation upon receipt of an operation signal from the emergency stop switch 34. Emergency stop control includes, for example, shutting down a driving control device 84 and a sub-driving control device 88, outputting emergency sound or an image to the speaker 80 or the like, and outputting a control signal for causing a steering ECU 104 to conduct an emergency stop operation. Emergency stop control will be described later.

The driving control device 84 incorporates an automatic driving control device 84a for driving control in the automatic driving mode and a manual driving control device 84b for driving control in the manual driving mode, and thus has functions of both devices. The driving control device 84 operates through control of hardware such as a processor or the like by software, and can be mounted as an electric control unit (ECU), for example. The driving control device 84 is connected to the bus 100a of the CAN 100, and receives an operation signal from the touch panel 28 via the interface processing device 82. The driving control device 84 receives an operation signal relevant to a driving mode selected by the operator from the touch panel 28, and, following the selected driving mode, executes control in the automatic driving mode (the control mode for control by the management center or the control mode for control by the automatic driving vehicle 10) or the manual driving mode.

The driving control device 84 is connected to a communication module 86, and can receive an input of control or the like from the management center. In the control mode for control by the management center of the automatic driving modes, driving control is executed based on the control by the management center. The driving control device 84 is connected to various automatic driving sensors 87, such as a camera or a lidar, and receives measured data from the automatic driving sensor 87. In the automatic driving mode, the driving control device 84 processes the measured result from the automatic driving sensor 87 to conduct automatic driving. In the automatic driving mode, operation signals, such as those from the GO button 40, the SLOW DOWN button 42, or the like, inputted from the touch panel 28, are inputted to the driving control device 84.

The driving control device 84 is connected to the mechanical operation unit 70 not via the CAN 100. In the manual driving mode, the driving control device 84 receives an operation signal from the mechanical operation unit 70 to execute driving control.

The driving control device 84 outputs a control signal to the steering ECU 104, a power ECU 108, a brake ECU 112, a lamp ECU 116, or the like, via the CAN 100. With the above, the driving control device 84 conducts specific driving operation.

The communication module 86 is a device for communication with the outside via an antenna or the like. The communication module is constituted by controlling hardware including a communication processing circuit or the like by software. The communication module 86 receives a control signal relevant to driving from the management center, and outputs the control signal to the driving control device 84. The communication module 86 is connected to another structure (not illustrated) of the automatic driving vehicle 10 to conduct various types of communication between the automatic driving vehicle 10 and outside the vehicle.

The sub-driving control device 88 is an auxiliary device for use instead of the driving control device 84 when the driving control device 84 does not operate. The sub-driving control device 88 is made to operate by controlling computer hardware, such as a processor, by software, and is mounted as an ECU, for example. The sub-driving control device 88, however, is a manual driving control device that does not have a driving control function in the automatic driving mode, and executes driving control only in the manual driving mode. Thus, the sub-driving control device 88 is not connected to the communication module 86.

The sub-driving control device 88 is connected to the mechanical operation unit 70, and receives an operation signal relevant to manual driving. The sub-driving control device 88 is connected to the bus 100*a* of the CAN 100 to output a control signal to the steering ECU 104, the power ECU 108, the brake ECU 112, the lamp ECU 116, or the like, via the CAN 100. The sub-driving control device 88 incorporates a switch (SW) 88*a*. Having received a stop signal from the interface processing device 82, the switch 88*a* shuts down the sub-driving control device 88.

A sub-battery 90 is a battery for supplying power to various auxiliary devices in the automatic driving vehicle 10. The automatic driving vehicle 10 includes the sub-battery 90 in addition to a main battery for supplying power to the driving motor. The drawing illustrates only three devices; namely, the interface processing device 82, the sub-driving control device 88, and the driving control device 84, as power feeding targets of the sub-battery 90. Power is supplied to the interface processing device 82 via a power-feeding wire 92, to the sub-driving control device 88 via a power-feeding wire 94, and to the driving control device 84 via a power-feeding wire 96.

Upstream the power-feeding wires 92, 94, 96, a switch (SW) 91 is provided. The switch 91 is a basic switch to be operated before activating the automatic driving vehicle 10. The switch 91 is formed using a relay, for example, and is installed as an outside switch provided on the outside wall of the automatic driving vehicle 10. An outside switch is a switch to be turned on by the operator before the operator gets on board the vehicle and to be turned off after the operator exists from the vehicle. With the switch 91 turned on, power supply from the sub-battery 90 to the interface processing device 82, the sub-driving control device 88, and the driving control device 84 starts, and with the switch 91 turned off, the power supply stops. Then, the operator gets on board the vehicle with the outside switch kept turned on, and turns on an activation switch (not illustrated), upon which the automatic driving vehicle 10 becomes ready for running.

After the switch 91 is tuned on, power supply from the sub-battery 90 to the interface processing device 82 is always performed via the power-feeding wire 92. That is, with the switch 91 in an on state, the interface processing device 82 remains activated at all times. The interface processing device 82 is a user interface control device for controlling a user interface, and is set activated even when the emergency stop switch 34 is operated so that various vehicle-mounted devices can be controlled.

After the switch 91 is turned on, power is always supplied from the sub-battery 90 to the sub-driving control device 88 via the power-feeding wire 94. Thus, with the switch 91 in an on state, in principle, the sub-driving control device 88 remains activated. The interface processing device 82, however, can shut down the sub-driving control device 88 by sending a stop signal to the switch 88*a* provided to the sub-driving control device 88. The switch 88*a* can be of any type without limitation, and can be made using a semiconductor, for example. With the emergency stop switch 34 operated, the interface processing device 82 sends a stop signal to the switch 88*a* to shut down the sub-driving control device 88. Note that shutting down refers to a process to implement a condition, or the condition itself, in which the sub-driving control device 88 conducts no driving control operation at all.

After the switch 91 is turned on, in principle, the driving control device 84 receives power from the sub-battery 90 via the power-feeding wire 96. Thus, with the switch 91 in an on state, in principle, the driving control device 84 remains activated. The interface processing device 82, however, can stop power supply via the power-feeding wire 96 to shut down the driving control device 84 by sending a stop signal to a switch (SW) 98 provided to the power feeding-wire 96. The switch 98 can have any structure without limitation, and can be formed using a relay, for example. When the emergency stop switch 34 is operated, the interface processing device 82 sends a stop signal to the switch 98 to disconnect the power-feeding wire 96 to thereby shut down the driving control device 84.

The CAN 100 is an in-vehicle network including the bus 100*a* and a bus 100*b*. The CAN 100 conducts communication according to a predetermined protocol. The buses 100*a*, 100*b* are connected to a central gate way (CGW) 102. The CGW 102 is a device for controlling communication between the buses 100*a*, 100*b* in the CAN 100.

The bus 100*b* is connected to the steering ECU 104, the power ECU 108, the brake ECU 112, and the lamp ECU 116. Each of these is constituted by controlling hardware including a processor by software.

The steering ECU 104 is a driving mechanism instruction device for managing and instructing a steering mechanism 106, or a driving mechanism. The steering mechanism 106 is a mechanical device for maintaining and changing the steering angle (that is, the orientation of the wheel 14) to control the advancing direction of the automatic driving vehicle 10. The steering ECU 104 sends a signal for instructing the steering mechanism 106 to steer to thereby control steering.

The power ECU 108 is a driving mechanism instruction device for managing and instructing a power control unit (PCU) 110, or a driving mechanism. The PCU 110, together with the drive motor, constitutes a system for acceleration/deceleration of the automatic driving vehicle 10. The PCU 110 is a device including a power semiconductor for controlling power supply to the drive motor or regeneration of power from the drive motor. The power ECU 108 sends to the PCU 110 a signal for instructing an operation of the power semiconductor, to thereby control the rotation of the drive motor and acceleration/deceleration of the automatic driving vehicle 10.

The brake ECU 112 is a driving mechanism instruction device for managing and instructing a brake 114, or a driving mechanism. The brake 114 is a mechanical device for applying a friction force to stop the rotation of the wheel 14. The brake ECU 112 designates the magnitude of the friction force which the brake 114 applies to control deceleration or stopping of the automatic driving vehicle 10.

The lamp ECU 116 is an instruction device for managing and instructing a turn lamp and hazard warning lamp 118. The turn lamp and hazard warning lamp 118 is a driving assisting device including a turn lamp for designating the advancing direction of the vehicle and a hazard warning lamp for notifying of danger for the vehicle. The turn lamp and the hazard warning lamp are normally implemented with the same lamp, and are discriminated by different manners of lighting. The lamp ECU 116 controls turning on and off of the turn lamp and hazard warning lamp 118.

In this embodiment, the automatic driving control system is constituted using a device including the driving control device 84, which functions as an automatic driving control device, the touch panel 28 including the SLOW DOWN button 42, or a deceleration operation device, for displaying images or the like, and the emergency stop switch 34, or an emergency stop operation device. Emergency stop control to be executed by the automatic driving control system will now be described specifically.

Figure 8:
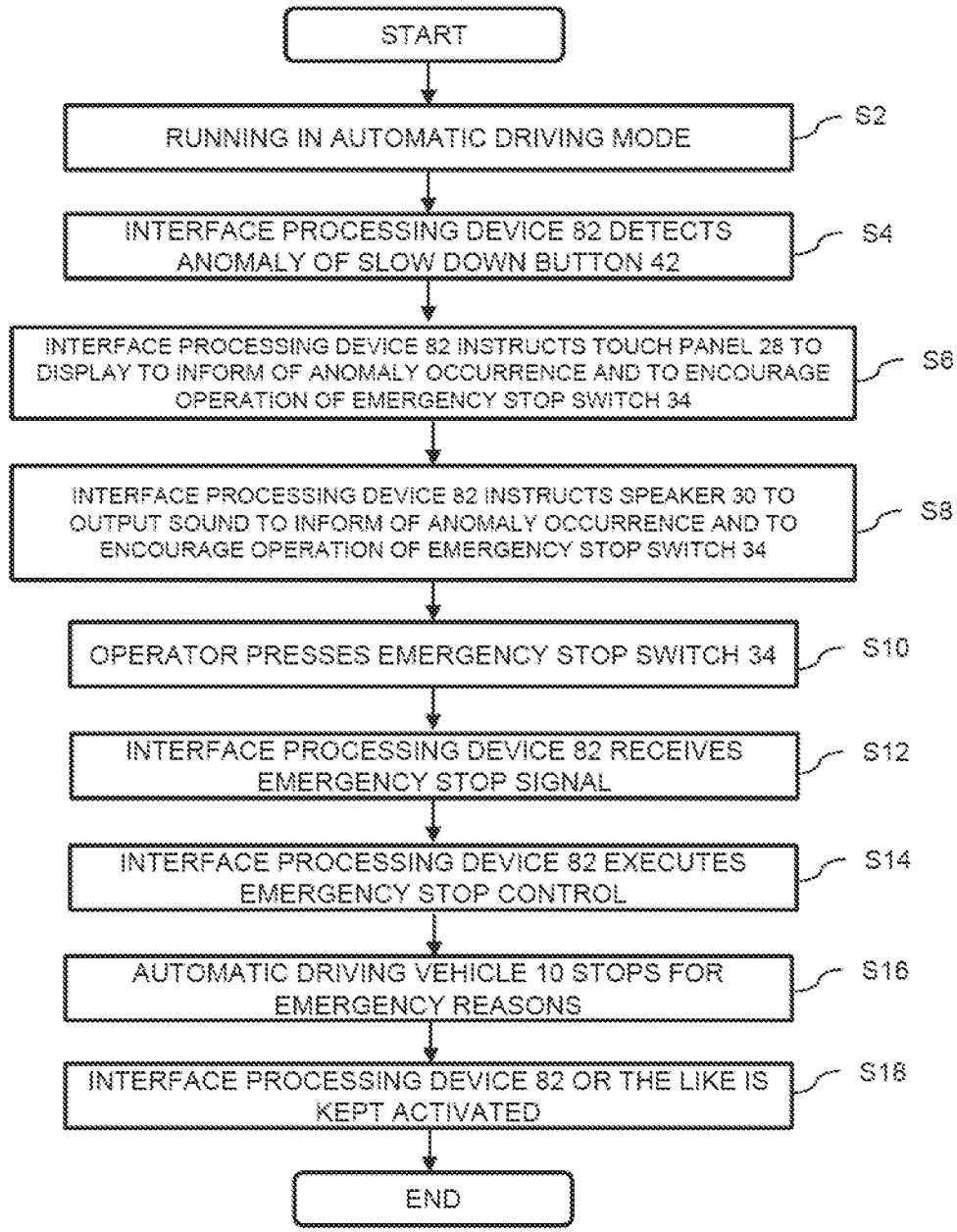
FIG. 8 is a flowchart of processing for operating an emergency stop switch.

FIG. 8 is a flowchart of the entire procedure for emergency stop control. Referring to the flowchart in FIG. 8, assume a situation in which the automatic driving vehicle 10 is running in the automatic driving mode (S2). At this step, the driving control device 84 sends a control signal to the steering ECU 104, the power ECU 108, the brake ECU 112, and the lamp ECU 116 to execute driving control of the automatic driving vehicle.

Assume that the interface processing device 82 detects an anomaly of the SLOW DOWN button 42 during automatic driving (S4). Anomaly of the SLOW DOWN button 42 includes an anomaly of display, such as, for example, the SLOW DOWN button 42 is not displayed, and an anomaly of operation input, such as, for example, the SLOW DOWN button 42 is not operable. An anomaly of communication, such as, for example, a situation where an operation signal is not outputted from the SLOW DOWN button 42 to the interface processing device 82 and further to the driving control device 84, can also be considered an anomaly of the SLOW DOWN button 42.

Upon detection of an anomaly of the SLOW DOWN button 42, the interface processing device 82 causes the touch panel 28 to display an image for notifying occurrence of an anomaly and encouraging operation of the emergency stop switch 34 (S6). At the same time, the interface processing device 82 instructs the speaker 80 to output sound for notifying occurrence of an anomaly and for encouraging operation of the emergency stop switch 34 (S8). That is, the touch panel 28 and the speaker 80 are used as transmission devices.

Figure 9:
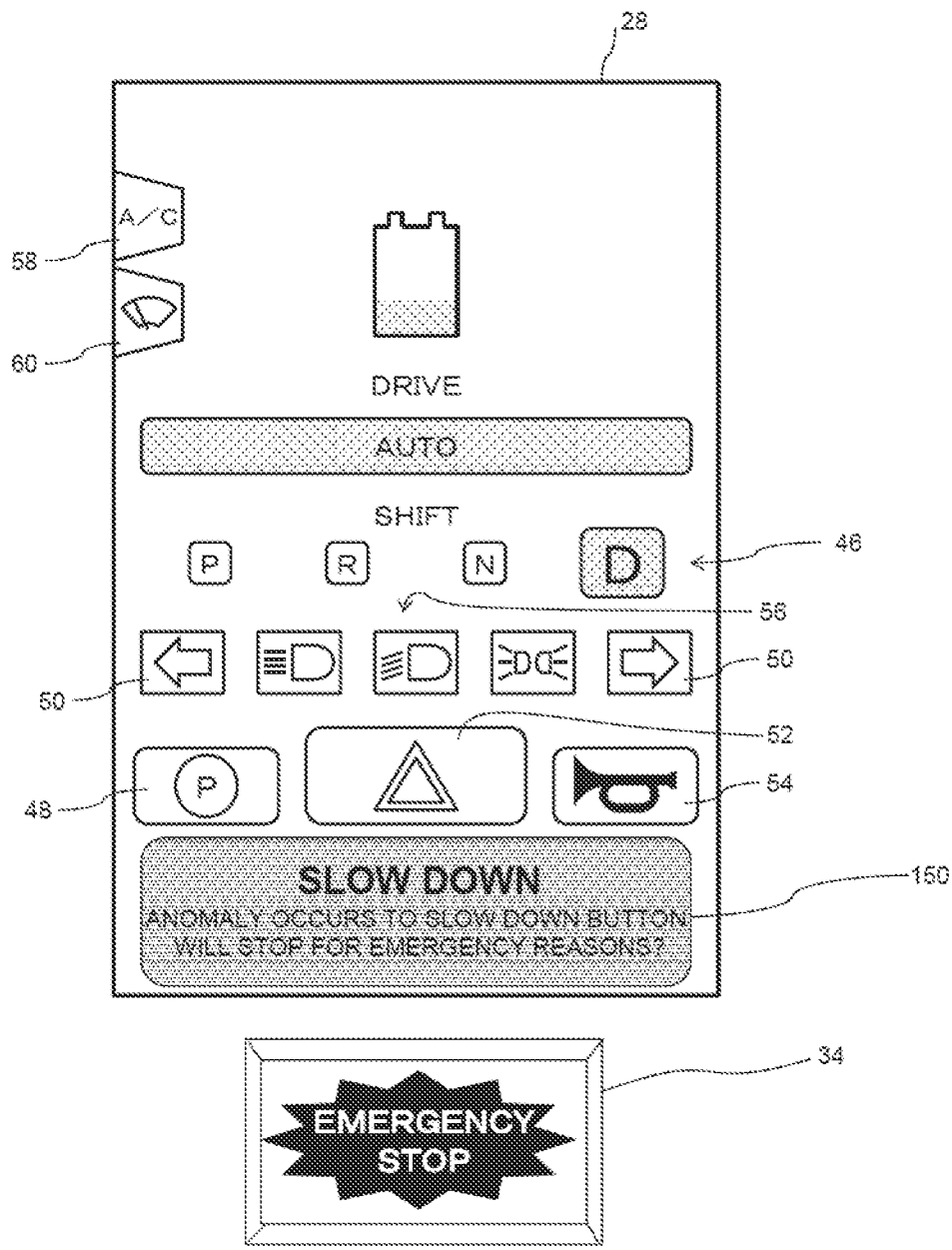
FIG. 9 illustrates an example of a display on a touch panel.

Here, referring to FIG. 9 and FIG. 10, an image to be displayed on the touch panel 28 to encourage the operator to make an emergency stop will be described. FIG. 9 illustrates an example of an image to be displayed on the touch panel 28 in step S6. On the touch panel 28, an image illustrated in FIG. 5 is normally displayed. After detection of an anomaly of the SLOW DOWN button 42, the SLOW DOWN button 42 disappears, so that the operator can visually know that the SLOW DOWN button 42 is inoperable.

Further, a message 150 is displayed on the touch panel 28 in an area where the SLOW DOWN button 42 is usually displayed. The message 150 reads as "anomaly occurs to SLOW DOWN button. Will stop for emergency?". With the above, the operator visually knows that an anomaly has occurred to the SLOW DOWN button 42, and is encouraged to apply an emergency stop. The decision whether to make an emergency stop is entrusted to the operator. This is because the automatic driving vehicle 10 can run automatically without operation of the SLOW DOWN button 42, and a decision not to make an emergency stop is tolerable.

Thus, the message 150 may read as, for example, "emergency stop is possible", "emergency stop switch is directly below", "press the emergency stop switch 34 for emergency stop", or "emergency stop is unnecessary". In any case, the message 150 informs the operator that an emergency stop is possible, and thus can be considered encouragement of an operation of the emergency stop switch 34.

When an operation for an emergency stop is encouraged, the light emitting diode of the emergency stop switch 34 starts blinking as illustrated in FIG. 9. This allows the operator to immediately and visually recognize the location of the emergency stop switch 34. In addition, the operator can feel from the emergency stop switch 34 as well that an operation for an emergency stop is being encouraged.

Figure 10:
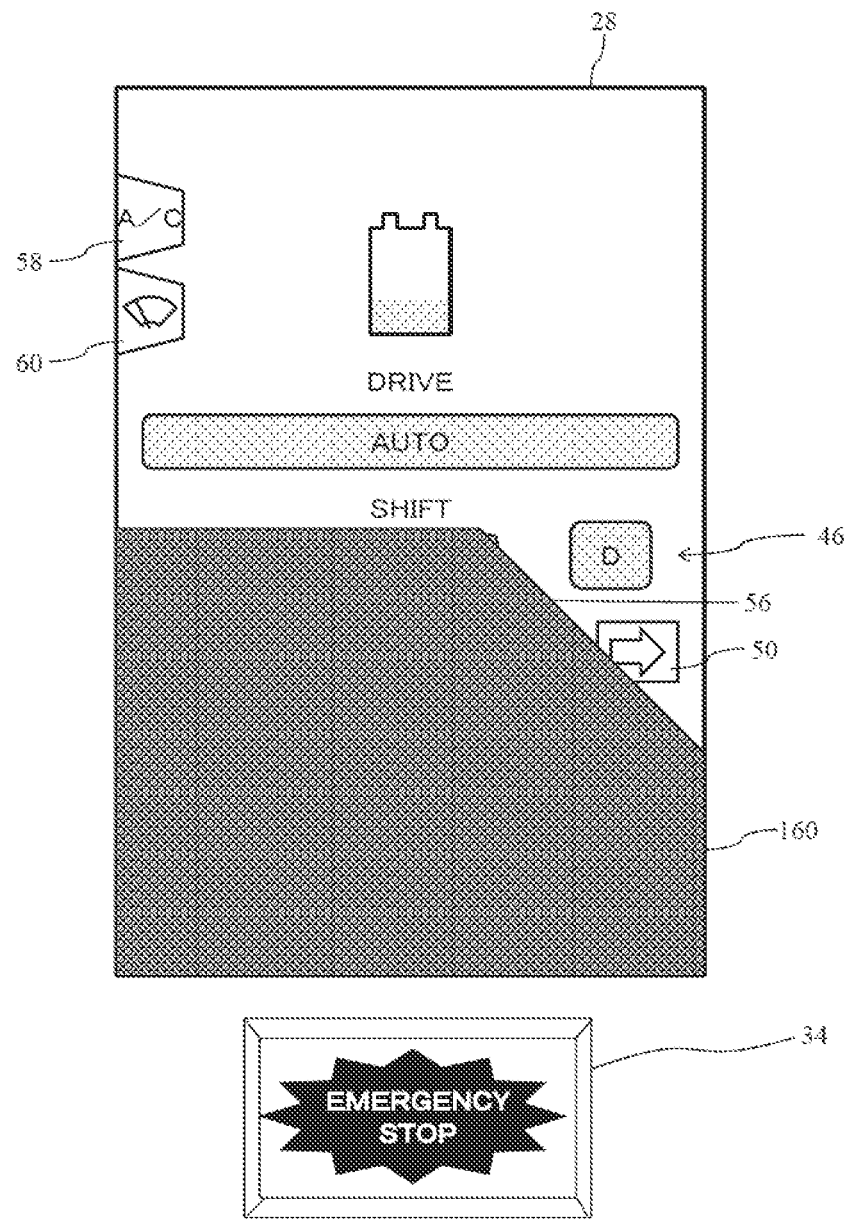
FIG. 10 illustrates an example of a screen displayed on a touch panel when an anomaly occurs to the touch panel.

FIG. 10 illustrates an example of occurrence of an anomaly of display of the SLOW DOWN button 42. In the example in FIG. 10, a lower portion 160 of the touch panel 28 is darkened, which hinders normal display such as that illustrated in FIG. 5. In addition, the SLOW DOWN button 42 positioned in the lower portion 160 is not displayed. Pressing the position where the SLOW DOWN button 42 is usually displayed may enable operation of the SLOW DOWN button 42, depending on the cause of anomaly of the touch panel 28. Although the automatic driving vehicle 10 can run without the SLOW DOWN button 42 being pressed, as described above, transmission is made to encourage the operator to apply an emergency stop, since an anomaly did occur to the SLOW DOWN button 42.

In the example illustrated in FIG. 10, different from the example illustrated in FIG. 9, a message cannot be displayed where the SLOW DOWN button 42 is usually displayed. Thus, no such a display is made on the touch panel 28 in this example, and sound is outputted instead from the speaker 80. Moreover, the light emitting diode of the emergency stop switch 34 is blinked to thereby inform the operator of occurrence of an anomaly and also to encourage operation of the emergency stop switch 34.

Returning to FIG. 8, when the operator presses the emergency stop switch 34 (S10), the emergency stop switch 34 converts a press operation to an electric signal to output to the interface processing device 82. The interface processing device 82 receives the electric signal as an emergency stop instruction signal (S12). Then, the interface processing device 82 conducts emergency stop control to be described below in detail (S14). As a result, the automatic driving vehicle 10 makes an emergency stop (S16). In contrast, when the operator does not press the emergency stop switch 34, the automatic driving vehicle 10 continues running in the automatic driving mode.

When the automatic driving vehicle 10 makes an emergency stop, in principle, the interface processing device 82 is kept activated and the devices other than those relevant to automatic driving are kept activated (S18). For example, as the interface processing device 82 is kept activated, the touch panel 28, or a user interface, can receive inputs for functions other than those relevant to driving control. In other words, it is possible to control vehicle-mounted instruments, such as the turn lamp, the headlight, the air conditioner, the wiper, or the like, which are controlled through the touch panel 28. In addition, the communication module 86 also remains capable of receiving from the management center inputs for functions other than those relevant to driving control. Thus, it is possible to promptly conduct, for example, safety check or smooth contact with the management center. Note that whether manual driving is set applicable after application of an emergency stop depends on the emergency stop control aspect relative to the sub-driving control device 88, as will described later.

Figure 11:
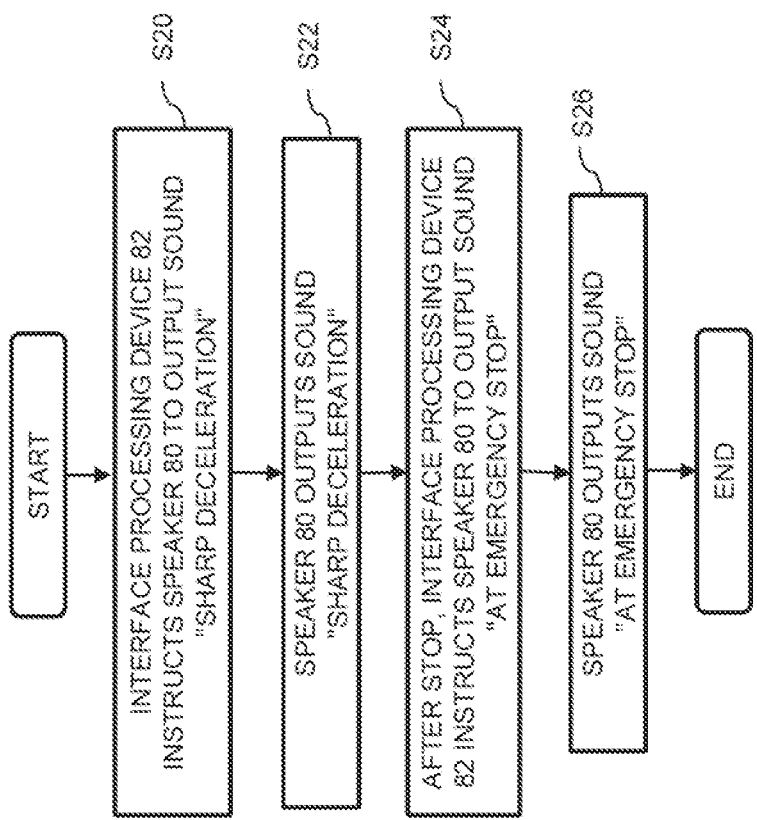
FIG. 11 is a flowchart of processing relevant to a speaker.

FIG. 11 to FIG. 17 are flowcharts of the respective processing procedures to be executed in applying an emergency stop. FIG. 11 is a flowchart of a processing procedure to be executed relative to the speaker 80 under emergency stop control by the interface processing device 82 in step S14 of FIG. 8. That is, upon input of the emergency stop signal, the interface processing device 82 outputs pre-stored sound data, namely, "sharp deceleration", to the speaker 80 (S20). Upon receipt of the sound data, the speaker 80 outputs the sound "sharp deceleration" to inform the passengers that the automatic driving vehicle 10 will decelerate sharply (S22).

After the automatic driving vehicle 10 stops, the interface processing device 82 outputs pre-stored sound data "at emergency stop" to the speaker 80 (S24). Upon receipt of the sound data, the speaker 80 outputs the sound "at emergency stop" to inform the passengers that the automatic driving vehicle 10 is at an emergency stop (S26). The speaker 80 repetitively outputs the sound "at emergency stop" at appropriate intervals. Similarly, the interface processing device 82 causes the display 36 to display the messages of "sharp deceleration" and "at emergency stop" as well.

Figure 12:
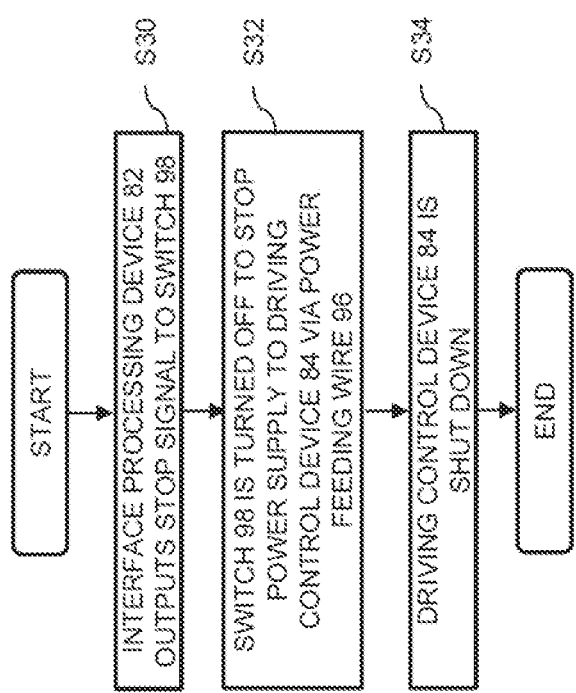
FIG. 12 is a flowchart of processing relevant to a driving control device.

FIG. 12 is a flowchart of the processing procedure to be executed in relation to the driving control device 84 under emergency stop control by the interface processing device 82 in step S14 of FIG. 8. That is, upon receipt of the emergency stop signal, the interface processing device 82 outputs a stop signal to the switch 98 (S30). The switch 98 then disconnects the power feeding wire 96 to stop power supply to the driving control device 84 (S32). With power supply stopped, the driving control device 84 cannot operate, and thus is shut down (S34). Consequently, the driving control device 84 no longer sends a control signal to the steering ECU 104, the power ECU 108, the brake ECU 112, and the lamp ECU 116, whereby the automatic driving control by the driving control device 84 is terminated.

Figure 13:
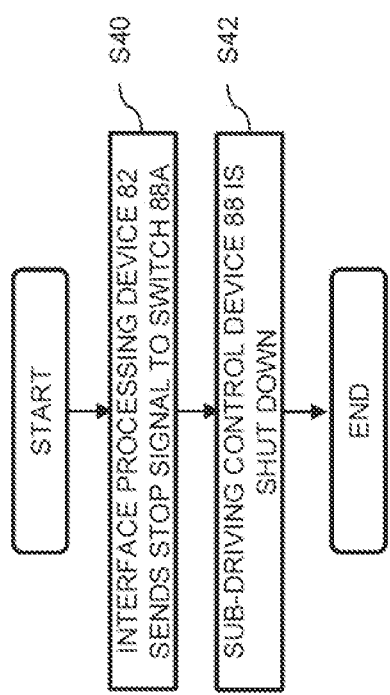
FIG. 13 is a flowchart of processing relevant to a sub-driving control device.

FIG. 13 is a flowchart of the procedure for control relative to the sub-driving control device 88 under emergency stop control by the interface processing device 82 in step S14 of FIG. 8. That is, upon receipt of the emergency stop signal, the interface processing device 82 outputs a stop signal to the switch 88a (S40). The switch 88a then shuts down the sub-driving control device 88 (S42). Shutting down is effected, for example, by the switch 88a by stopping power supply to the sub-driving control device 88.

The sub-driving control device 88 does not execute any processing while the automatic driving vehicle 10 is running in the automatic driving mode under control by the driving control device 84. However, since the sub-driving control device 88 is functionally capable of sending a control signal to the steering ECU 104, the power ECU 108, the brake ECU 112, and the lamp ECU 116, the sub-driving control device 88 is shut down to assure that no control signal is sent to the steering ECU 104, the power ECU 108, the brake ECU 112, and the lamp ECU 116.

Alternatively, an aspect in which the sub-driving control device 88 is kept valid, rather than being shut down, is possible. In this case, the sub-driving control device 88 is set usable after completion of an emergency stop or a predetermined checkup. This makes it possible to resume driving of the automatic driving vehicle 10 in a stopped state in the manual driving mode.

Figure 14:
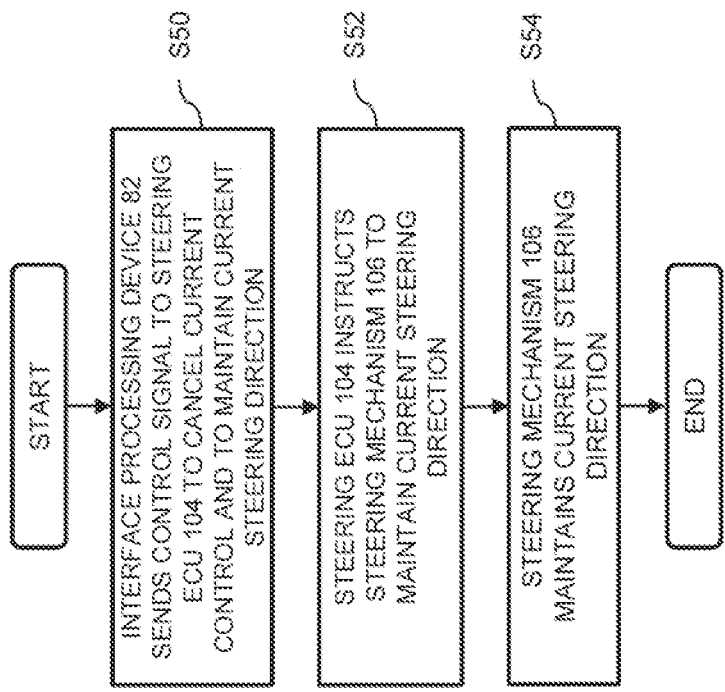
FIG. 14 is a flowchart of processing relevant to steering.

FIG. 14 is a flowchart of the procedure for control relevant to steering under emergency stop control by the interface processing device 82 in step S14 of FIG. 8. That is, upon receipt of the emergency stop signal, the interface processing device 82 sends a control signal to the steering ECU 104 to cancel the currently received control and to maintain the current steering direction, which is an emergency stop operation (S50). Upon receipt of the control signal, the steering ECU 104 immediately instructs the steering mechanism 106 to maintain the current steering direction (S52). Based on the instruction, the steering mechanism 106 operates such that the current steering direction is maintained (S54).

Note that the steering-related emergency stop operation may be executed in a different aspect from the above-described aspect. Specific examples of such an aspect include an aspect in which the steering angle is set in a straight direction, or an aspect in which an optimum steering angle is set in accordance with the vehicle speed, the steering angle, the road condition, the peripheral situation, or the like, at that time. An optimum steering angle may be occasionally calculated by the driving control device 84, for example, before the emergency stop switch 34 is pressed, and transmitted to the interface processing device 82.

Figure 15:
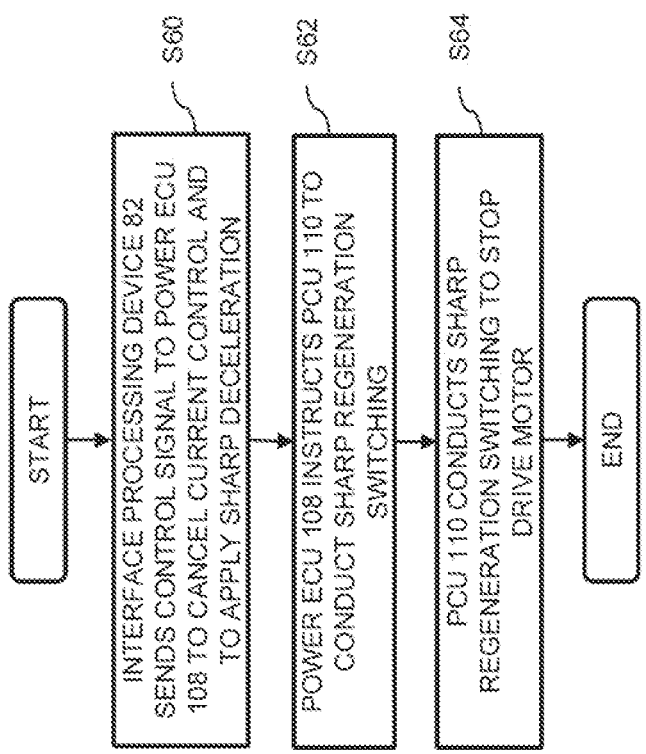
FIG. 15 is a flowchart of processing relevant to a drive motor.

FIG. 15 is a flowchart of the procedure for control relevant to a drive motor under emergency stop control by the interface processing device 82 in step S14 of FIG. 8. That is, upon input of the emergency stop signal, the interface processing device 82 sends a control signal to the power ECU 108 to cancel the currently received control and to apply sharp deceleration, which is an emergency stop operation (S60). Upon receipt of the control signal, the power ECU 108 instructs the power semiconductor of the PCU 110 to conduct rapid regeneration switching (S62). The PCU 110 then executes rapid regeneration switching to thereby sharply decelerate the drive motor (S64). Note that an emergency stop operation may include an aspect in which the drive motor is idled, rather than applying deceleration through regeneration of the drive motor.

Figure 16:
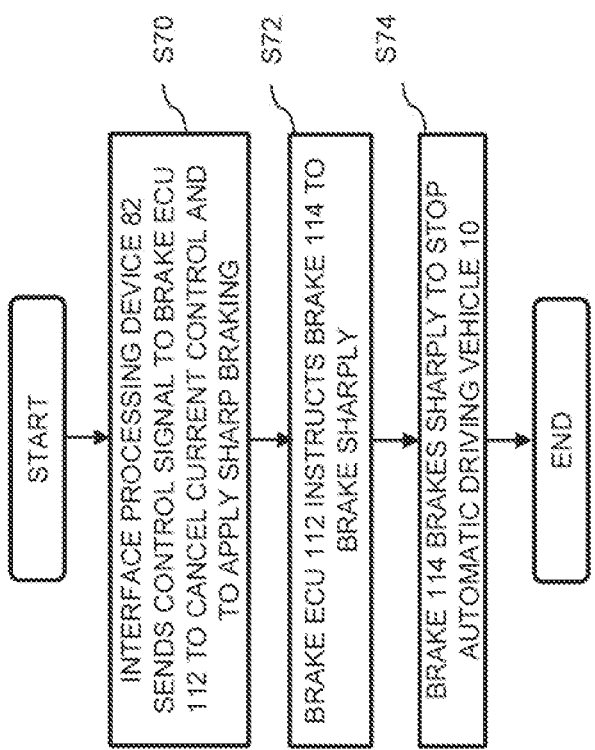
FIG. 16 is a flowchart of processing relevant to a brake.

FIG. 16 is a flowchart of the procedure for brake control under emergency stop control by the interface processing device 82 in step S14 of FIG. 8. That is, upon receipt of the emergency stop signal, the interface processing device 82 sends a control signal to the brake ECU 112 to cancel the currently received control and to brake sharply, which is an emergency stop operation (S70). Upon receipt of the control signal, the brake ECU 112 causes the brake 114 to brake sharply (S72). The brake 114 then brakes sharply to stop the automatic driving vehicle 10 (S74). Note that deceleration upon sharp braking is conducted within the range assuring the safety of the passengers. The load of the brake 114 may be selected to be at an optimum value, depending on the vehicle speed, the steering angle, and the road condition at the time. An optimum load may be occasionally calculated by the driving control device 84, for example, before the emergency stop switch 34 is pressed, and transmitted to the interface processing device 82.

Figure 17:
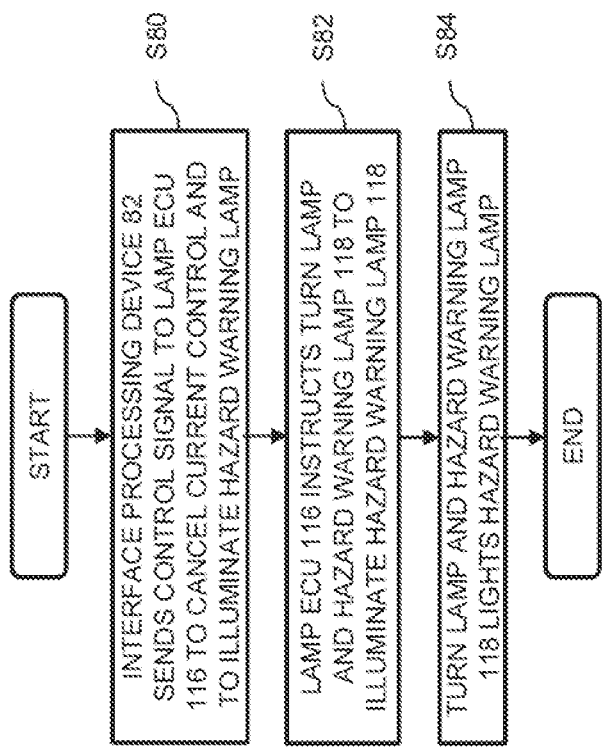
FIG. 17 is a flowchart of processing relevant to illumination of a hazard warning lamp.

FIG. 17 is a flowchart of the procedure for hazard warning lamp lighting control under emergency stop control by the interface processing device 82 in step S14 of FIG. 8. That is, upon input of an emergency stop signal, the interface processing device 82 sends a control signal to the lamp ECU 116 to cancel the currently received control and to illuminate the hazard warning lamp (S80). Upon receipt of the control signal, the lamp ECU 116 immediately instructs the turn lamp and hazard warning lamp 118 to illuminate the hazard warning lamp (S82). Then, the turn lamp and hazard warning lamp 118 illuminates the hazard warning lamp (S84).

The processing steps described above while referring to the FIG. 11 to FIG. 17 are assumed to start substantially simultaneously even though a slight difference in time may be caused depending on the order in which the interface processing device 82 begins the respective processing procedures. If a slight difference should be caused depending on the order in which the respective processing procedures are conducted, output of a control signal to the brake ECU 112 may be first applied to put first priority on stopping the vehicle. Alternatively, if alert to passengers is prioritized over stopping the vehicle, sound output from the speaker 80, illustrated in FIG. 9, and, further, display on the display 36 may be first applied. Still alternatively, the orders of the processing procedures can be arbitrarily changed, or a waiting period can be ensured before start of the processing procedures in consideration of the period of time necessary for signal transmission or processing.

In the above-described processing, since the driving control device 84 and the sub-driving control device 88 are shut down, neither the driving control device 84 nor the sub-driving control device 88 sends a control signal to the steering ECU 104, the power ECU 108, the brake ECU 112, or the lamp ECU 116 after the start of emergency stop processing. There is a possibility, however, that the steering ECU 104, the power ECU 108, the brake ECU 112, or the lamp ECU 116 receives a control signal from the driving control device 84 or the sub-driving control device 88 after having received a control signal from the interface processing device 82 due to a difference in the period of time necessary to shut down, depending on the hardware or software configuration of the control system. To address the above, the steering ECU 104, the power ECU 108, the brake ECU 112, and the lamp ECU 116 may be set so as not to receive a next control signal after receipt of a control signal from the interface processing device 82 until at least elapse of a predetermined period of time thereafter, or not to execute processing based on the next control signal.

The automatic driving vehicle 10 checks safety after an emergency stop. When safety is assured or the possibility of driving is assured or the like, an attempt is made to start driving. In this processing, for example, the operator turns on the activation switch in the cabin again. In this case, after safety check in accordance with a program, the driving control device 84 and the sub-driving control device 88 are re-activated. With the above, the automatic driving vehicle 10 can resume driving in the selected mode (either the automatic driving mode or the manual driving mode). Should any deficiency be found with the driving control device 84 during the re-activation processing, for example, only the sub-driving control device 88 is reactivated. In this case, only driving in the manual driving mode can be resumed.

Figure 18:
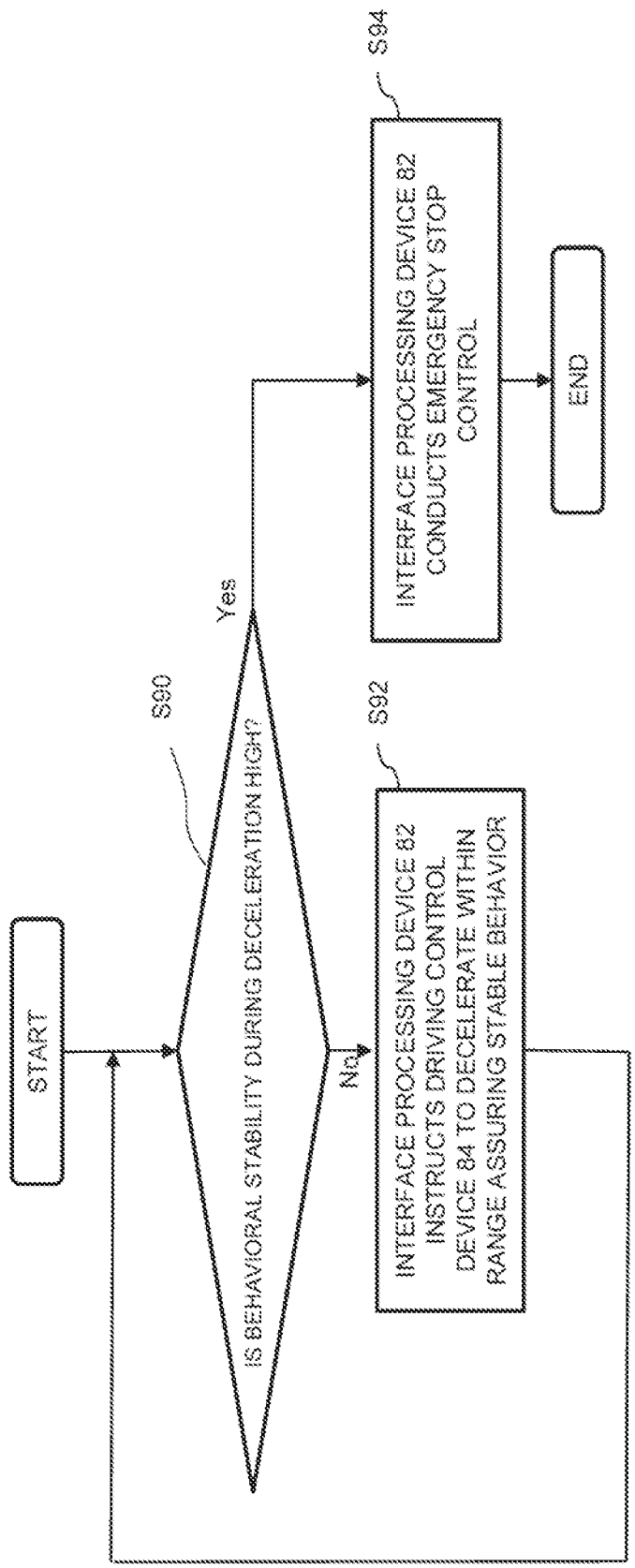
FIG. 18 is a flowchart of emergency stop control based on behavioral stability during deceleration.

Referring to FIG. 18, a modified example of the emergency stop control by the interface processing device 82 will now be described. FIG. 18 is a flowchart of control to be executed instead of the control by the interface processing device 82 in step S14 of FIG. 8.

In the example illustrated in FIG. 18, in the case where the emergency stop switch 34 is operated (S10 in FIG. 8) and the interface processing device 82 receives an emergency stop signal (S12 in FIG. 8), the interface processing device 82 evaluates whether the behavioral stability during deceleration of the automatic driving vehicle 10 is high (S90). A state with a high behavioral stability during deceleration refers to a state in which an error in speed, posture, position, or the like of the automatic driving vehicle 10 during the process up to stopping of the vehicle is small, and the automatic driving vehicle 10 is thus readily controllable. In general, the behavioral stability is low when at least one of the elements, such as a high speed, a large steering angle (turning along a sharp curve), a small friction between the tires and the road surface, or the like, is present. The interface processing device 82 receives information on the speed, the steering angle, the friction coefficient, or the like, from the steering ECU 104, the power ECU 108, the brake ECU 112, the driving control device 84, or the like, at short intervals to be kept informed of the level of the behavioral stability at all times. Upon receipt of an emergency stop signal, the interface processing device 82 immediately evaluates the level of the behavioral stability.

If the behavior stability is low, the interface processing device 82 instructs the driving control device 84 to apply sharp deceleration within a range that stabilizes the behavior (S92). Then, after elapse of a short period of time, the evaluation in step S90 is conducted again.

When the automatic driving vehicle 10 gradually decreases the speed or passes over a sharply curved road to reach a straight road, for example, the behavioral stability during deceleration will eventually increase. In this case, the interface processing device 82 executes the above-described emergency stop control (S94).

Thus, with the low behavioral stability during deceleration of the automatic driving vehicle 10, the period of time (a first period of time) necessary after operation of the emergency stop switch 34 until invalidation of the running control by the driving control device 84 under emergency stop control becomes longer. In addition, with low behavioral stability during deceleration, deceleration (first deceleration) after operation of the emergency stop switch 34 until stop of the automatic driving vehicle 10 is conducted relatively slowly as a whole.

In contrast, with the high behavioral stability during deceleration, the period of time (a second period of time) necessary after operation of the emergency stop switch 34 until invalidation of the running control by the driving control device 84 is very short. In addition, with the high behavioral stability during deceleration, deceleration (second deceleration) after operation of the emergency stop switch 34 until stop of the automatic driving vehicle 10 is conducted sharply as a whole.

Note that the behavioral stability during deceleration can be always kept high in running in the automatic driving mode. In this case, as described above, the running control by the driving control device 84 can be invalidated immediately after the emergency stop switch 34 is operated to stop the vehicle for emergency reasons.

Figure 19:
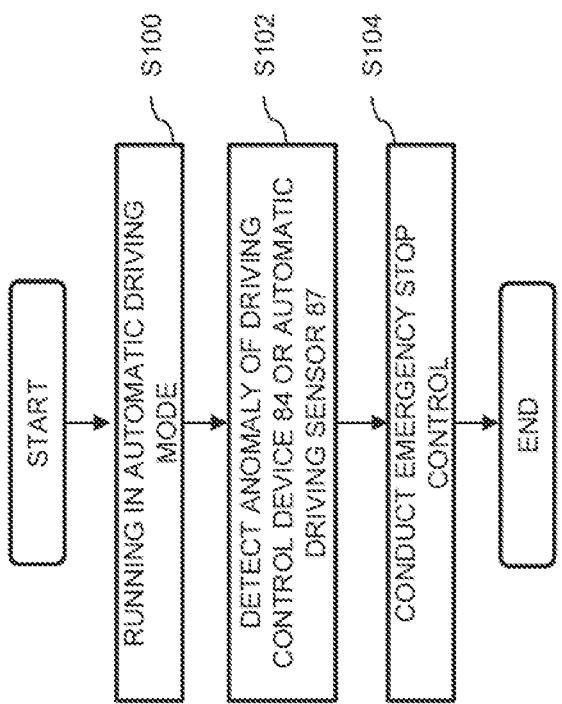
FIG. 19 is a flowchart of forcible application of emergency stop control.

Finally, referring to FIG. 19, there will be described an aspect in which an emergency stop is forcibly applied rather than entrusting the operator with application of an emergency stop. FIG. 19 is a flowchart of control to be executed upon occurrence of an anomaly that hinders running of the automatic driving vehicle 10 in the automatic driving mode.

While the automatic driving vehicle 10 is running in the automatic driving mode (S100), a determination is determine to see whether various units of the automatic driving vehicle 10 are normally functioning. Should any anomaly occur to the driving control device 84 or the automatic driving sensor 87 of the automatic driving vehicle 10 (S102), the automatic driving vehicle 10 can hardly continue running in the automatic driving mode. Then, emergency stop control is forcibly applied, rather than entrusting the operator with a decision (S104). Emergency stop control is conducted by the interface processing device 82, as described above. Alternatively, other devices, such as the driving control device 84 or the like, may conduct emergency stop control, as emergency stop control is irrelevant to an input from the emergency stop switch 34.

The above-described emergency stop control is effective in addressing an unauthorized access from a third party through the communication module 86 (a third party making an unauthorized access will hereinafter be referred to as a cracker or a hacker). The automatic driving vehicle 10 employs high security measures for control software including the communication module 86, and it is thus normally not possible for a cracker to make an unauthorized access. A cracker, however, may possibly find a security hole to access the driving control device 84 and rewrite the program in the driving control device 84 to input a false signal to the driving control device 84 or to output a false signal from the driving control device 84.

Should any deficiency occur to the driving operation of the automatic driving vehicle 10 due to an attack from a cracker, the operator presses the emergency stop switch 34 when he/she notices the deficiency. Moreover, if the control unit of the automatic driving vehicle 10 detects any anomaly that hinders continuation of running, emergency stop control is forcibly started. In the above, since the interface processing device 82 immediately shuts down the driving control device 84 in the automatic driving vehicle 10, it is possible to prevent spread of deficiency attributed to the driving control device 84. Further, shutting down the sub-driving control device 88 can prevent spread of deficiency attributed to the sub-driving control device 88.

A cracker may possibly attempt an unauthorized access from the driving control device 84 through the CAN 100 or the like to the interface processing device 82, the steering ECU 104, the power ECU 108, the brake ECU 112, or the lamp ECU 116. The interface processing device 82, the steering ECU 104, the power ECU 108, the brake ECU 112, or the lamp ECU 116, however, are different hardware from the driving control device 84, which makes it further difficult to make an unauthorized access therethrough. In this view, this embodiment, in which the driving control device 84, or the starting point of an access, is shut down is effective.

In general, however, the operator does not realize that the cause of an anomaly is an unauthorized access by a cracker. Moreover, the control units of the automatic driving vehicle 10, such as the interface processing device 82, the driving control device 84, or the like, cannot anticipate an operation to be applied against an attack from crackers. In view of the above, in the case where any deficiency should occur, a situation is assumed in which a decision as to whether to make an emergency stop is better entrusted to the operator, rather than forcibly applying an emergency control, unless the deficiency hinders continuation of automatic running. In this view, in this embodiment, processing is made to encourage the operator to make an emergency stop should any anomaly occur to the SLOW DOWN button 42.

The invention claimed is:

1. An automatic driving control device comprising at least one processor, wherein:
   the automatic driving control device controls running of an automatic driving vehicle in an automatic driving mode and determines whether or not an anomaly occurs to a slow down button displayed in a first area on a touch panel, the slow down button receiving an operation from an operator to provide instructions to decelerate; and
   upon determination that the anomaly occurs to the slow down button displayed in the first area on the touch panel, the at least one processor causes the touch panel to delete the slow down button from the first area, and display an image for notifying occurrence of the anomaly in the first area on the touch panel.

* * * * *